ated as $Al_2O_3$ and# United States Patent [19]

Wildt

[11] 4,097,301
[45] Jun. 27, 1978

[54] STABLE CHLORIDE PROCESS ANATASE SLURRIES

[75] Inventor: Hans-Achim Dietmar Wildt, Wilmington, Del.

[73] Assignee: E. I. Du Pont de Nemours and Company, Wilmington, Del.

[21] Appl. No.: 782,738

[22] Filed: Mar. 30, 1977

[51] Int. Cl.² ............................................. C09C 1/36
[52] U.S. Cl. ............................... 106/300; 106/308 B; 423/613
[58] Field of Search ................... 106/300, 309, 308 B; 423/613

[56] References Cited

U.S. PATENT DOCUMENTS

| | | | |
|---|---|---|---|
| 3,146,119 | 8/1964 | Ritter | 106/300 |
| 3,859,115 | 1/1975 | Wiseman et al. | 106/300 |

*Primary Examiner*—Winston A. Douglas
*Assistant Examiner*—J. V. Howard

[57] ABSTRACT

Process for producing aqueous slurries of chloride process anatase titanium dioxide pigment by adding to the slurry from 0.03 to 0.45% by weight of sodium aluminate or aluminum trichloride, calculated as $Al_2O_3$ and based on the weight of the titanium dioxide pigment. The resulting slurries retain relatively low viscosity for at least one day.

4 Claims, No Drawings

STABLE CHLORIDE PROCESS ANATASE SLURRIES

BACKGROUND OF THE INVENTION

In the manufacture of $TiO_2$ pigments by the vapor phase oxidation of titanium tetrachloride it is frequently advantageous to calcine the pigment in a kiln to remove occluded chloride ion before further stages of processing take place, e.g., before dry milling with organic amines or other disperents. In some instances the economics or the logistics of available equipment dictate that the $TiO_2$ must be initially collected in the form of an aqueous slurry which can then be conveyed to the kiln. In the case of the collection of rutile chloride $TiO_2$ pigments, the slurries can be prepared and handled without undue complications, i.e., the slurries retain adequate stability with respect to viscosity over many hours or even days.

It has been found, however, that in the case of slurries of anatase chloride $TiO_2$ pigments severe and unexplainable thickening may occur after relatively short periods of time. This in turn gives rise to serious difficulties in pumping the slurries from one area to another and in holding the slurries for storage. While it would be possible to merely effect dilution of such a slurry to the point where it would be again pumpable, this would be disadvantageous in that the operating efficiency of the kiln would be greatly reduced, i.e., a much greater quantity of water would have to be volatilized. One attempt to solve the problem of anatase chloride titanium dioxide slurries is described in U.S. Pat. No. 3,839,063. According to this teaching the anatase titanium dioxide pigment obtained from the oxidation reactor is combined with water in an amount to produce an aqueous slurry of at least 300 grams of titanium dioxide pigment per liter and with titanium tetrachloride or hydrochloric acid in an amount sufficient to provide a slurry pH of 1.0 to 1.5. While this process is satisfactory for maintaining the viscosity stability of many anatase chloride titanium dioxide aqueous slurries, this method may not always provide adequate viscosity stability, particularly at high concentrations of titanium dioxide pigment.

This invention provides for a process of treating anatase chloride titanium dioxide pigment slurries in such a way to provide a stable relatively low viscosity over a long period of time even at high concentrations of $TiO_2$.

SUMMARY OF THE INVENTION

This invention is directed to an improvement in the process for the production of anatase titanium dioxide pigment by (1) oxidizing titanium tetrachloride in the vapor phase to form anatase titanium dioxide pigment and (2) combining the anatase titanium dioxide pigment from the oxidation reactor with water to form an aqueous slurry. The improvement resides in adding to the aqueous slurry from 0.03 to 0.45% by weight, and preferably from 0.1 to 0.3% by weight, of an inorganic aluminum compound selected from sodium aluminate and aluminum trichloride, calculated as $Al_2O_3$ and based on the weight of the titanium dioxide pigment in the aqueous slurry. It has been found that the slurries so produced have a reduced tendency to thicken on standing or during transportation and retain a viscosity of less than 2000 cps and generally in a range from 150 to 400 cps for at least one day at concentrations of $TiO_2$ ranging from 600 grams per liter to as high as 1400 grams per liter. The slurries prepared according to this process can be produced with a higher solids content than would otherwise retain viscosity stability and pumpability and provide a substantial economic benefit, particularly where the slurry must be subsequently calcined.

DETAILED DESCRIPTION OF THE INVENTION

This invention utilizes anatase pigments obtained by the vapor phase oxidation of $TiCl_4$. There are numerous patents describing the production of such pigments using anatase promoters (or rutile inhibitors) which may be incorporated in small amounts in the $TiCl_4$ stream to be co-oxidized and to serve to increase the level of anatase crystal content in the final product. An especially valuable technique for the production of anatase $TiO_2$ via the chloride process is that described in U.S. Pat. No. 3,856,929 to A. H. Angerman and C. G. Moore. According thereto a combination of a silicon halide, such as $SiCl_4$, and a phosphorus halide, such as $PCl_3$, is used for co-oxidation along with $TiCl_4$ to increase the percentage of anatase in the product. The utilization of a combination makes it possible to reduce the total quantity of the additives and thus serves to maintain optical and other properties at a maximum. In a typical embodiment according thereto, the oxidation of $TiCl_4$ is carried out in the presence of amounts of a silicon halide and a phosphorus halide sufficient to provide in the resultant pigment from 0.25 to 1.5 weight percent of oxidized silicon halide, calculated as $SiO_2$, and 0.05 to 1 weight percent of oxidized phosphorus halide, calculated as $P_2O_5$. Further details concerning other aspects of the vapor phase oxidation of $TiCl_4$ are given in that patent, the disclosure of which is herein incorporated by reference.

Regardless of the technique employed to produce the anatase chloride $TiO_2$ pigment it is commonly utilized directly from the oxidation reactor to form an aqueous slurry without intervening processing steps. The aqueous slurry can be formed in any conventional manner, such as that described in U.S. Pat. No. 3,839,063. For example, the $TiO_2$ pigment can be collected dry and then transferred to any suitable mixing vessel to be combined with water. Alternatively, it is also possible to initially collect the $TiO_2$ pigment directly as so-called "reactor discharge" or "cyclone discharge" by a wet procedure in which the particles are directly introduced into an aqueous medium.

In accordance with this invention viscosity stability of the anatase chloride $TiO_2$ aqueous slurry can be achieved by adding from 0.03 to 0.45% by weight of an inorganic aluminum compound selected from sodium aluminate and aluminum trichloride, calculated as $Al_2O_3$ and based on the weight of the titanium dioxide pigment. The inorganic aluminum compound can be added as a solid, or preferably because such small quantities are required, in the form of an aqueous solution thereof. While the optimum amount of inorganic aluminum compound may depend to a certain extent upon the concentration of $TiO_2$ in the slurry, excess chloride which may be present, and acidity of the initial slurry, in practice the preferred amount of inorganic aluminum compound ranges from 0.1 to 0.3% by weight, calculated as $Al_2O_3$ and based on the weight of $TiO_2$ pigment in the slurry. Sodium aluminate is the preferred inorganic aluminum compound for economics and ease of addition.

Although the pH of the final treated anatase chloride aqueous slurry is not particularly critical to the general practice of this invention, it has been found that the treated aqueous slurries exhibiting optimum viscosity stability throughout the desired concentration range have a pH from about 3 to 4.5. Sodium aluminate can be added directly to the $TiO_2$ slurry without concern for the final pH and at the point the desired viscosity is reached the pH of the slurry will usually range from 3 to 4.5. However, when aluminum chloride is utilized sufficient sodium hydroxide must be added to the slurry to provide a pH from 3 to 4.5 to achieve the desired decrease in viscosity and stability of the decreased viscosity in the final slurry. However, it is believed that pH of the final slurry alone is not a primary criteria to account for the success achieved in the practice of the invention, because controlled experiments utilizing sodium hydroxide in place of sodium aluminate showed an increase in viscosity at similar pH rather than a decrease.

In general, the practice of this invention is of particular benefit when producing slurries having the highest possible levels of titanium dioxide solids. Consequently, it is preferred that the slurries so produced contain at least 600 grams per liter of anatase chloride $TiO_2$ pigment up to a maximum of about 1400 grams per liter. The slurries treated in accordance with this invention will retain viscosity stability for at least 24 hours. In the event that the viscosity of the treated slurry begins to rise after the time to a level beyond which conventional pumping equipment could tolerate, e.g., 2000 cps, it is possible to again reduce the viscosity by simple addition of acids such as HCl, which also lowers the pH of the treated slurry to the desired range of 3 to 4.5. However, this addition of HCl is not to be confused with that utilized in accordance with U.S. Pat. No. 3,839,063, because the addition of acid is only effective on a slurry which has been previously treated with the inorganic aluminum compound in accordance with the requirements of this invention and will provide substantially no decrease in viscosity if utilized alone.

It is preferred for optimum fluidity of the anatase chloride $TiO_2$ pigment slurries that the viscosity be less than 500 cps. In the practice of this invention viscosities between 150 and 400 cps can generally be achieved by adding the inorganic aluminum compound in the ranges specified above. The optimum addition for any particular anatase chloride $TiO_2$ pigment slurry can easily be determined by a simple laboratory test. A small sample of the slurry, for example 0.3 liters, can be titrated with an aqueous solution of the inorganic aluminum compound, until the viscosity of the sample slurry decreases markedly to the desired level, i.e., less than 500 cps. This titration is quite reproducible and easy to monitor because the end point, i.e., the point at which viscosity sharply decreases, is very clear. From this information the amount of inorganic aluminum compound necessary to decrease the viscosity of a larger quantity of the same slurry can be calculated easily. It is necessary that the addition of the inorganic aluminum compound remain within the range stated above, once the desired low viscosity is reached, because if amounts of inorganic aluminum compound in excess of the upper limit of 0.45% by weight, calculated as $Al_2O_3$, are employed the slurry will rapidly thicken to an unmanageable viscosity. In the event too much sodium aluminate is added to the slurry, the viscosity can be again lowered by the addition of HCl, as can be done if the slurry thickens upon standing.

As indicated hereinbefore, this invention is particularly advantageous when it is desired to calcine the anatase chloride $TiO_2$ pigment and for one reason or another it is desirable that the pigment be in slurry form when fed to the kiln where calcining takes place. Regardless of the reason, however, such a calcining step is advantageously carried out at a temperature of about 500° C. to about 11,050° C., typically for at least one-half hour or more, in order to eliminate moisture and chloride ion. After the calcining step is concluded, the pigment may then be subjected to further conventional processing steps. For example, it will normally be advantageous to dry mill the pigment, for example, in a fluid energy mill of the known type.

The following examples will serve to illustrate the invention. Percentages therein are by weight unless otherwise indicated. Moreover, the percentages are expressed in relation to the quantity of anatase $TiO_2$ pigment which is treated or otherwise involved.

In the examples pigment viscosity data indicates Brookfield viscosity measurements made on slurries at 25° C., 100 rpm, using a number 3 spindle for values up to 1000 centipoises (cps) and the appropriate spindle for centipoise values in excess thereof.

EXAMPLES 1, 2, 3 and Control $TiCl_4$ was oxidized with oxygen in the vapor phase in accordance with the procedure described in U.S. Pat. No. 3,856,929 to produce a predominantly anatase pigment containing approximately 0.63% $SiO_2$ and 0.30% $P_2O_5$. The $TiO_2$ product stream leaving the reactor is quenched with chlorine, cooled and collected. Portions of the $TiO_2$ product were formed into aqueous slurries having the concentrations as shown in Table I.

EXAMPLE 1

Two hundred fifty milliliters of an aqueous slurry of the anatase chloride $TiO_2$ pigment prepared above was placed in a vessel equipped with an agitator. The initial viscosity is shown in Table I. Then sodium aluminate was added to the slurry by dropwise addition of an aqueous sodium aluminate solution having a concentration equivalent to 345 grams of $Al_2O_3$ per liter of solution until the viscosity of the slurry became notably less at which time 0.18% of $Al_2O_3$ had been added dropwise. The viscosity was found to be 280 cps at a pH of 3.1 and was stable, i.e., remained substantially unchanged for 24 hours. To determine the maximum amount of sodium aluminate the slurry would tolerate, more sodium aluminate was added to the slurry until an amount of 0.43% was present. The viscosity was found to be 240 cps at a pH of 5.4 and stable. Addition up to 0.47% of sodium aluminate, calculated as $Al_2O_3$, resulted in severe thickening of the slurry.

EXAMPLE 2

The procedure of Example 1 was followed except that the initial slurry concentration was 840 grams per liter. The results are shown in Table I.

Control

The procedure of Example 2 was followed except that instead of the aqueous solution of sodium aluminate, an aqueous solution of sodium hydroxide containing 50% by weight of NaOH was utilized.

The results in Table I show the viscosity of the slurry continued to increase with addition of NaOH even at the same pH as observed for sodium aluminate addition.

EXAMPLE 3

Two hundred ninety milliliters of an aqueous slurry of the anatase chloride $TiO_2$ pigment prepared above was placed in a vessel equipped with an agitator. The initial viscosity is shown in Table I. Then sodium aluminate was added to the slurry by dropwise addition of an aqueous sodium aluminate solution having a concentration equivalent to 360 grams of $Al_2O_3$ per liter of solution until the viscosity of the slurry became somewhat less at which time 0.024% of $Al_2O_3$ had been added dropwise. Further sodium aluminate was added in the amounts shown in Table I until the viscosity of the slurry increased beyond 10,000 cps with the addition of 0.1% of $Al_2O_3$.

To thin the slurry, one drop of concentrated HCl was added to the thickened slurry at which point the slurry became very thin, <200 cps, and had a pH of 4.4. Then one drop of the sodium aluminate solution was added to the thinned slurry. The viscosity of the resulting slurry was too high to measure and the pH was 5.0. One more drop of concentrated HCl was then added to the thickened slurry. The resulting slurry had a viscosity of 120 cps at a pH of 4.4, which remained stable for 13 days.

TABLE I

| Example | Concentration of Slurry (grams/liter) | Initial Viscosity (cps) | $Al_2O_3$ (% by weight) | Stable Viscosity (cps) | pH |
|---|---|---|---|---|---|
| 1 | 1100 | >10,000 | 0.18 | 280 | 3.1 |
|   |      |         | 0.43 | 240 | 5.4 |
|   |      |         | 0.47 | >10,000 | 6.1 |
| 2 | 840 | 4,000 | 0.14 | 700 | 2.9 |
|   |     |       | 0.4  | 120 | 4.9 |
|   |     |       | 0.44 | >10,000 | –** |
| Control | 840 | 4,000 | 0.11* | 4,000 | 1.4 |
|   |     |       | 0.22 | 4,000 | 1.5 |
| 3 | 1015 | >10,000 | 0.55 | 4,500 | 1.8 |
|   |      |         | 0.72 | >10,000 | 3.6 |
|   |      |         | 1.1  | >10,000 | 7.7 |
|   |      |         | 0.024 | 8,000 | 2.4 |
|   |      |         | 0.048 | 180 | 3.7 |
|   |      |         | 0.072 | 140 | 4.3 |
|   |      |         | 0.1  | >10,000 | –** |

*Represents amount of NaOH added
**Too thick for pH measurement

What is claimed is:

1. In a process for the production of anatase titanium dioxide pigment by (1) oxidizing titanium tetrachloride in th vapor phase to form anatase titanium dioxide pigment and (2) combining the anatase titanium dioxide pigment from the oxidation reactor with water to form an aqueous slurry, the improvement for producing highly concentrated slurry having stable viscosity comprising adding to said aqueous slurry, consisting essentially of from 600 g/l to 1400 g/l of anatase titanium dioxide pigment, from 0.03 to 0.45% by weight of an inorganic aluminum compound selected from sodium aluminate and aluminum trichloride, calculated as $Al_2O_3$ and based on the weight of the titanium dioxide pigment.

2. Process for the production of anatase titanium dioxide pigment according to claim 1 wherein the pH of the final slurry is from 3 to 4.5.

3. Process for the production of anatase titanium dioxide pigment according to claim 1 wherein from 0.1 to 0.3% by weight of said inorganic aluminum compound is added to said slurry.

4. Process for the production of anatase titanium dioxide pigment according to claim 3 wherein said inorganic aluminum compound is sodium aluminate.

* * * * *